E. BROWN.
ORCHARD CULTIVATOR.
APPLICATION FILED AUG. 6, 1912.
1,073,325.
Patented Sept. 16, 1913.
3 SHEETS—SHEET 2.
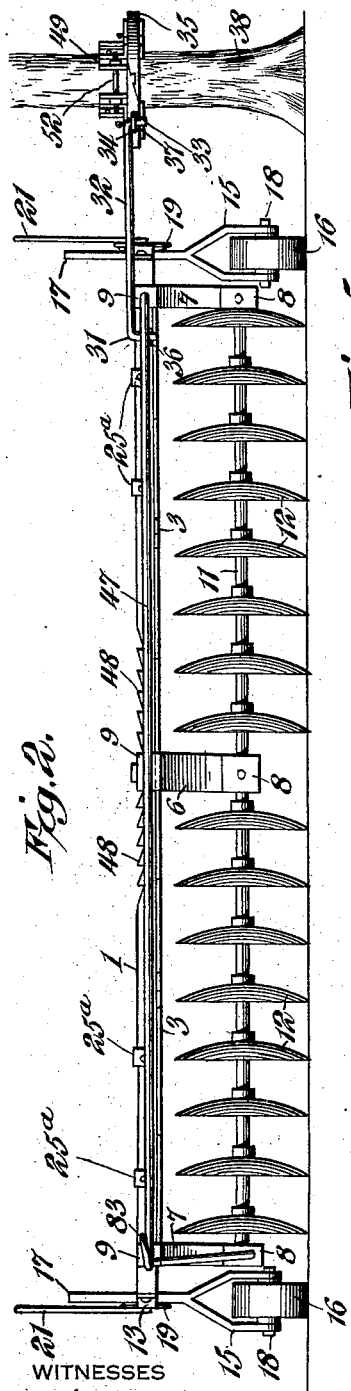
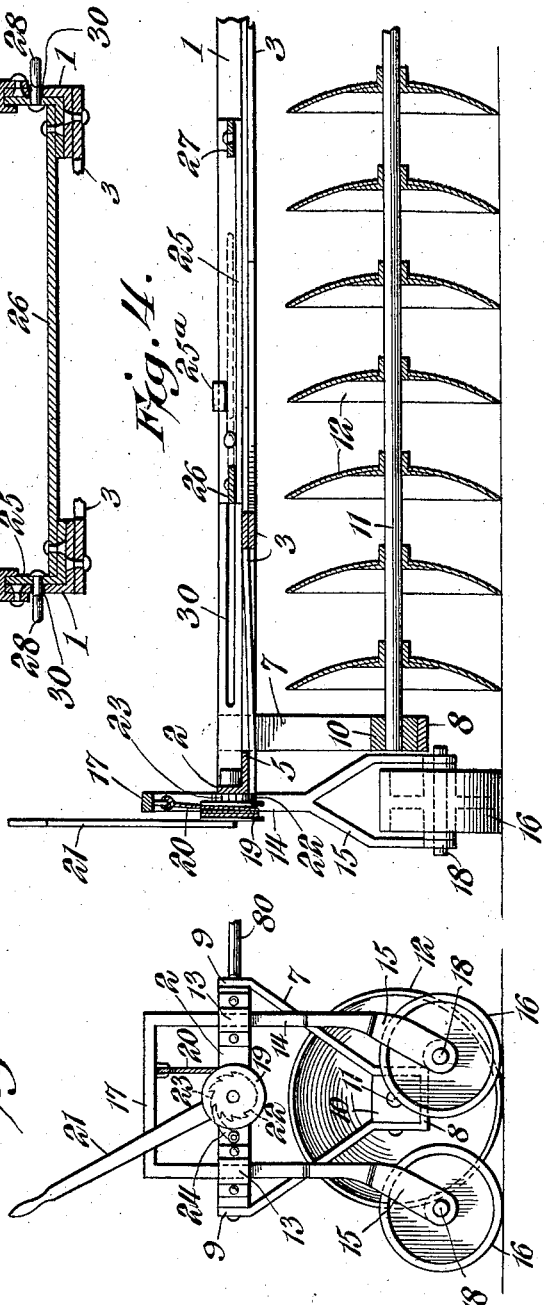
Eugene Brown, INVENTOR, E. BROWN.
ORCHARD CULTIVATOR.
APPLICATION FILED AUG. 6, 1912.
1,073,325.
Patented Sept. 16, 1913.
3 SHEETS—SHEET 3.
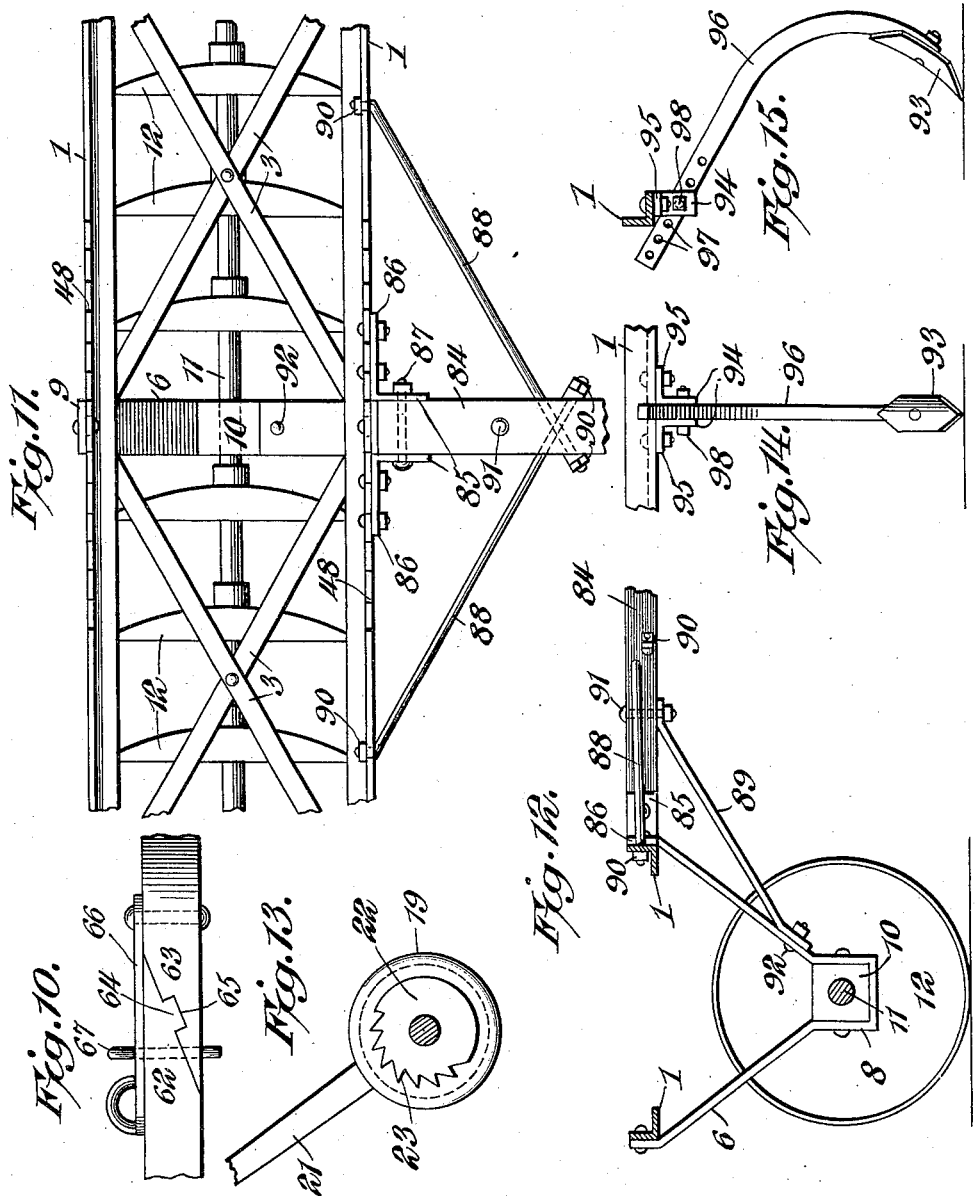
WITNESSES
Howard D. Orr.
H. F. Riley
Eugene Brown, INVENTOR,
BY C. G. Siggers
ATTORNEY

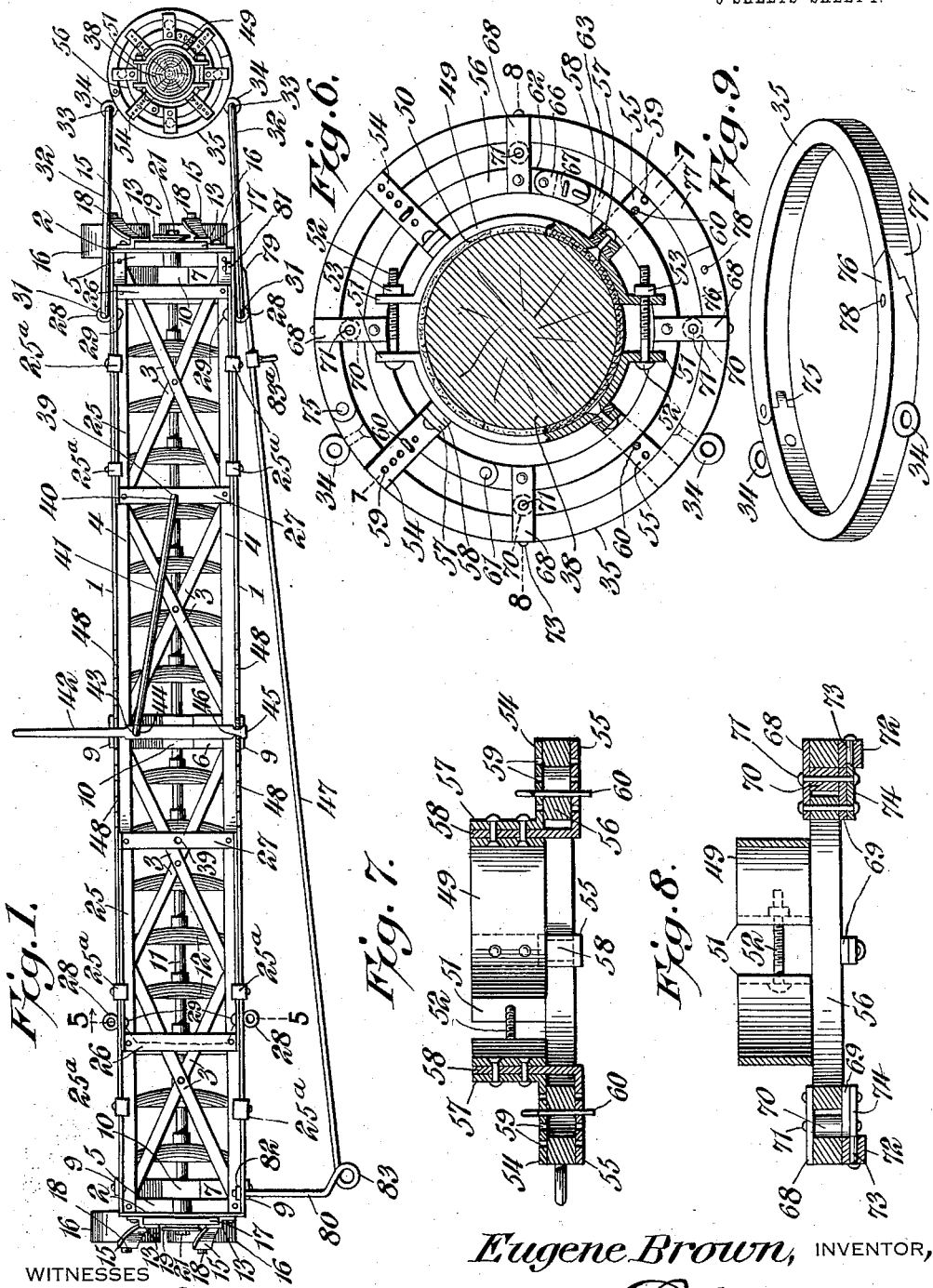
E. BROWN.
ORCHARD CULTIVATOR.
APPLICATION FILED AUG. 6, 1912.
1,073,325.
Patented Sept. 16, 1913.
3 SHEETS—SHEET 1.
Eugene Brown, INVENTOR,
BY
ATTORNEY.

UNITED STATES PATENT OFFICE.

EUGENE BROWN, OF COLFAX, WASHINGTON, ASSIGNOR TO COLFAX MANUFACTURING COMPANY, INC., OF COLFAX, WASHINGTON, A CORPORATION OF WASHINGTON.

ORCHARD-CULTIVATOR.

1,073,325.	Specification of Letters Patent.	Patented Sept. 16, 1913.

Application filed August 6, 1912. Serial No. 713,693.

*To all whom it may concern:*

Be it known that I, EUGENE BROWN, a citizen of the United States, residing at Colfax, in the county of Whitman and State of Washington, have invented a new and useful Orchard-Cultivator, of which the following is a specification.

The invention relates to improvements in orchard cultivators.

The object of the present invention is to improve the construction of orchard cultivators, and to provide a simple and comparatively inexpensive cultivator of great strength and durability, equipped with means for enabling it to be attached to a tree, and capable of cultivating the soil around the trees to the desired extent, depth and distance from the tree according to the character of the ground.

A further object of the invention is to provide an orchard cultivator of this character, adapted to be adjusted to the trunks of trees of different diameters, and capable of operation without interference from the branches of the trees, so that the limbs may be permitted to grow as close to the ground as desired.

The invention also has for its object to provide an orchard cultivator adapted to be rotated around the tree in either direction to throw the soil either toward or from the tree, and capable also of being employed with a central draft pole or tongue when it is desired to use the cultivator for ordinary cultivation.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of an orchard cultivator, constructed in accordance with this invention and shown applied to a tree, the latter being in section. Fig. 2 is a front elevation of the same. Fig. 3 is an end elevation of the outer end of the cultivator. Fig. 4 is an enlarged central longitudinal sectional view of the outer portions of the cultivator. Fig. 5 is a transverse sectional view on the line 5—5 of Fig. 1. Fig. 6 is an enlarged plan view partly in section of the tree clamp and the bearing for the inner end of the cultivator. Fig. 7 is a vertical sectional view of the same on the line 7—7 of Fig. 6. Fig. 8 is a similar view on the line 8—8 of Fig. 6. Fig. 9 is a detail perspective view of the rotary bearing ring. Fig. 10 is a detail view, illustrating the construction of the overlapped ends of the sections of the stationary ring or member and the means for securing the same together. Fig. 11 is a plan view of the cultivator, a central draft pole or tongue being applied to the same to adapt it for ordinary cultivation. Fig. 12 is a vertical sectional view, taken longitudinally with respect to the draft pole or tongue, the latter being shown in elevation. Fig. 13 is a detail view of the ratchet device for raising and lowering the disks and the ground wheels. Figs. 14 and 15 are detail views, illustrating the manner of attaching the cultivator teeth to the frame of the cultivator.

Like numerals of reference designate corresponding parts in all the figures of the drawings.

In the accompanying drawings in which is illustrated the preferred embodiment of the invention, the frame of the cultivator comprises in its construction parallel longitudinal bars 1, constructed of angle metal or other suitable material and connected at their terminals by end bars 2 and braced at intervals by crossed diagonally arranged bars 3, centrally secured together and having their terminals fastened to horizontal flanges 4, extending inwardly at the bottom or lower edges of the longitudinal bars 1. The longitudinal flanges 5 of the end bars are fitted against and secured to the lower faces of the horizontal flanges 4 of the longitudinal bars 1. The cultivator frame, which is oblong, may, however, be constructed of any other suitable material and be braced in any desired manner.

The frame is provided at its ends and center with relatively fixed bearing brackets or standards 6 and 7, each constructed of a single piece of rod metal, or other suitable material angularly bent at the center to provide a lower approximately U-shaped loop or portion 8 and front and rear inclined sides, which have their upper terminals 9 secured to the outer faces of the longitudinal bars 1 of the cultivator frame. The lower loops or portions 8 of the standards receive bearing boxes 10 for the reception of a horizontal shaft 11 upon which concavo-convex cultivator disks 12 are mounted at regular intervals, but cultivator teeth or shovels may be employed if desired, as hereinafter more fully explained. The journal boxes or bearings 10, which are rectangular to fit the lower loops or bends of the standards, are suitably secured within the same.

The cultivator frame is equipped at its ends with guides 13, arranged in pairs and consisting of angularly bent plates, riveted or otherwise secured to the outer faces of the end bars of the cultivator frame and forming vertical openings for the reception of vertically disposed relatively movable standards 14, having forked or bifurcated lower portions 15 for the reception of ground wheels 16 and connected at their upper ends by a horizontal top bar 17. The sides of the forks or bifurcations 15 of the standards 14 are provided with suitable bearings in which are arranged the shafts or axles 18 of the ground wheels 16, which are adapted to regulate the depth which the cultivator disks penetrate the soil and also to support the disks in an elevated position above the ground when transferring the cultivator from one orchard or field to another.

The relative adjustment of the cultivator frame and the ground wheels is effected by means of drums 19, located at the ends of the cultivator frame and each having a grooved periphery for the reception of a cable 20, or other flexible connection, which is attached at one end to the drum and at its other end to the top connecting bar 17 of the relatively movable standards 14. The drum is adapted to be rotated to wind the cable 20 around its periphery and to unwind it therefrom, and it is provided with an arm or lever 21, connected with the drum at the outer face thereof and adapted to be oscillated to partially rotate the drum. When the cables are wound around the drums the cultivator frame is raised and the disks thereof may be lifted clear of the ground, and by adjusting the drums, the cultivator disks may be permitted to project the desired distance below the wheels 16. Each of the drums is provided at its inner face with an integral ratchet member 22, having a plurality of ratchet teeth 23 arranged to be engaged by a gravity pawl 24 adapted to lock the drum against retrograde rotation.

No claim is made in the present application to the means for adjusting the ground or gage wheels 16.

The cultivator frame is equipped at each end with a slidable frame 25, supported by the horizontal flanges 4 of the longitudinal bars 1 and arranged between and guided by the latter and retained in place thereon by overhanging approximately L-shaped flanges 25$^a$. The overhanging flanges 25$^a$, which engage the upper edges and the inner faces of the sides of the slidable frame, preferably consist of plates provided with exterior attaching portions, riveted or otherwise secured to the outer faces of the longitudinal bars 1. The slidable frame, which is oblong, is composed of spaced front and rear bars constructed of angle iron or other suitable material and connected at their ends by transverse bars 26 and 27. The side bars of the slidable frame are equipped with front and rear eyes 28, having shanks 29 extending through slots 30 of vertical wings or flanges of the longitudinal bars 1 of the cultivator frame, and secured to the front and rear side bars of the slidable frame. These eyes detachably receive the inner angularly bent terminals 31 of approximately horizontal rods or bars 32, which are also provided with downwardly turned outer terminals 33, detachably arranged in eyes 34 of a rotary ring or member 35. The angularly bent terminals 31 and 33 are retained in the eyes 28 and 34 by means of keys 36 and 37, or other suitable fastening devices, and they are adapted to be transferred from one end of the cultivator frame to the other, but the connecting bars or rods 32 and the means for connecting the same with the trunk 38 of a tree may be duplicated so that either end of the cultivator frame may be connected with the tree without transferring the connecting means from one end of the cultivator to the other. The inner portions of the horizontal bars are arranged at the outer faces of the longitudinal bars 1 of the cultivator frame to maintain the same in rigid relation with the cultivator frame.

The inner end bar 27 of the slidable frame 25 is provided with a central perforation 39 for the reception of an angularly bent end 40 of a rod 41, extending from the slidable frame to and pivotally connected with an operating lever 42. The lever is also provided with a perforation 43, and the adjacent end 44 of the rod is bent at an angle and is arranged in the perforation 43 of the lever. The ends of the connecting rod 41 form pivots and are suitably secured to the slidable frame and the lever. The operating lever 42 is provided at its front end with a head 45, connected with the body portion of the lever by a reduced portion or neck and adapted to be arranged in either of the openings 46 of the front and rear bars 1, whereby it is adapted to be reversed to suit the arrangement of the draft rod 47, which is also adapted to be reversed to enable the cultivator to be rotated in either direction. The front and rear longitudinal bars 1 of the cultivator frame are provided at their intermediate portions with ratchet teeth 48, shouldered in opposite directions, as clearly illustrated in Fig. 2 of the drawings, and adapted to be engaged by the operating lever for securing the slidable and cultivator frames in their relative adjustment and for holding the cultivator frame against inward direction on the tree 38.

The rotary ring or member 35 is adjustably mounted on the tree 38 by means of an adjustable tree clamp 49 and a relatively fixed bearing supported by the same. The tree clamp, which is composed of two approximately semicircular sections, is equipped at the inner faces thereof with a pad 50 consisting of a sleeve of fabric or other flexible material adapted to prevent the clamp from injuring the tree. The terminals 51 of the sections of the clamp are bent outwardly and perforated for the reception of bolts 52 having nuts 53 and adapted to be adjusted to cause the sections of the clamp to grip the trunk of a tree with the desired pressure. By the adjusting means of the clamp, the latter is adapted to be readily secured to the trunks of trees of different diameters, and the clamp is also separable to admit it to be readily applied to and removed from the trunk of a tree.

The tree clamp is equipped with upper and lower horizontal supporting arms 54 and 55, arranged in pairs and receiving and supporting a relatively stationary ring or member 56. The arms 54 and 55 are provided with vertical attaching portions 57 and 58, which are riveted or otherwise secured to the sections of the tree clamp. The supporting arms, which extend radially from the tree clamp at the lower edge thereof, permit the sections of the tree clamp to be moved inwardly and outwardly with respect to the relatively stationary ring or member to permit the clamp to engage trees of different sizes. The supporting arms 54 and 55 are provided with registering perforations 59 adapted to receive cotter pins 60, or other suitable fastening means, which are placed at the inner edge of the stationary ring or member 56 for holding the same in a relatively fixed position.

The stationary ring or member is composed of two approximately semi-circular sections provided at one end with a suitable hinge joint 61 and having their other ends 62 and 63 beveled, overlapped and interlocked, one of the terminals 62 being provided with a transverse rib 64 to fit in a corresponding transverse groove 65 of the other end 63 of the stationary ring or member. The inner interlocked faces of the overlapped ends are inclined, and they are secured in their interlocked relation by means of a latch 66, pivoted at one end to one of the sections of the stationary member or ring and overlapping the other section of the same and provided at its free end with a loop or handle. The latch is secured in its engaging position by means of a cotter pin 67, or other suitable fastening device, which pierces the latch and the overlapped ends 62 and 63 of the sections of the stationary ring or member. The stationary ring or member is adapted to be opened to permit it to be placed between the supporting arms of the tree clamp and to enable it to be removed therefrom. The stationary ring or member is also provided with upper and lower horizontal arms 68 and 69, arranged in pairs and consisting of plates or pieces secured at their inner portions to the upper and lower faces of the stationary ring or member and extending radially therefrom and supporting vertical anti-friction rollers 70 and suitable pivots or spindles 71, which pierce the upper and lower arms 68 and 69. The lower arms 69 terminate adjacent to the outer portions of the vertical rollers, and the stationary ring or member is equipped with horizontal supporting rollers 72, extending outwardly from the lower ends of the vertical anti-friction rollers 70 and mounted on horizontal spindles 73. The horizontal rollers 72 are located beneath and in parallelism with the outer portions of the upper arms 68 and the spindles 73, which are preferably provided at their outer ends with heads, having inner shanks or attaching portions 74, which are secured to the lower faces of the arms 69 by the fastening means thereof and also by the vertical spindles 71, which are also preferably headed at their terminals.

The stationary ring or member with its anti-friction bearings constitute a bearing for the rotary ring or member 35, which is also composed of two approximately semi-circular members, connected at one end by a suitable hinge joint 75 and having their other ends 76 and 77 beveled, overlapped and interlocked similar to the overlapped ends of the stationary ring or member. The overlapped ends are secured in their interlocked relation by means of a pin 78, or other suitable fastening device, which pierces the overlapped ends 76 and 77. The anti-friction rollers permit the movable ring or member 35 to rotate frictionlessly around the trunk of a tree and there is no material strain on the latter.

The draft rod 47, which extends longitudinally of the frame, is arranged at an acute angle to the front longitudinal bar 1, and is secured at its inner end 79 to the same and is provided at its outer end with an arm 80 detachably secured to the outer end of the front longitudinal bar 1 and offsetting the draft rod 47 from the same. The inner end 79 of the rod 47 is bent at an angle to pass through a perforation of the longitudinal bar 1 and is threaded to receive a nut 81 for engaging the said bar 1. The attached end of the arm 80 is also passed through a perforation of the longitudinal bar 1 and is threaded for the reception of a nut 82. Each of the bars 1 is provided at its inner and outer ends with perforations for the inner end 79 of the draft rod 47 and the inner or rear end of the arm 80, and the draft rod is thereby adapted to be attached to either of the longitudinal bars 1 to enable the cultivator to be rotated in either direction. The draft rod is coiled to provide an eye 83 at the angle formed by the rod 47 and its arm 80. The eye 83 is adapted to receive a hook or other means for connecting the draft animals with the cultivator. The draft rod is provided adjacent to its inner end with a hook 83ª designed to receive a chain to be connected with one of the hames for enabling the cultivator to be drawn forward in moving the same from one tree to another. The chain will slacken when the cultivator is rotated around the tree and will not affect the draft.

The cultivator is also adapted for straight cultivation, and when used for this purpose the draft rod 47 is removed and a draft hole or tongue 84 is connected with the front longitudinal bar 1 by means of a pair of approximately L-shaped brackets 85 having attaching wings or portions 86, which are riveted or otherwise secured to the front longitudinal bar 1. The brackets, which are located at opposite sides of the inner end of the tongue, are pierced by a transverse bolt 87, which passes through the inner end of the tongue and secures the same to the brackets. The tongue is also braced by angularly disposed rods 88, and is supported at its inner portion by an inclined brace 89. The rods 88, which pierce the front longitudinal bar 1, converge forwardly therefrom and pass through the inner portion of the tongue. The front and rear terminals of the angularly related rods 88 are preferably threaded for the reception of nuts 90, but they may be secured to the cultivator frame by any other suitable means. The inclined brace 89, which is located beneath the tongue, is secured at its upper end to the same by a vertical bolt 91, and its lower or rear end is secured to the front inclined side of the central standard or bearing bracket by a bolt 92, or other suitable fastening device. Each of the longitudinal bars may be equipped with the brackets 85 to enable the tongue to be attached to either side of the cultivator frame.

When it is desired cultivator teeth 93 may be substituted for the disks, and for this purpose the cultivator frame is designed to be equipped with L-shaped brackets 94, having attaching portions 95 riveted or otherwise secured to the cultivator frame. The brackets, which are arranged in pairs, depend from the cultivator frame and the cultivator teeth have shanks 96 provided with perforations 97 and adjustably secured between the depending portions of the brackets by means of bolts 98. The shanks have curved lower portions and straight upper portions, as clearly shown in Figs. 14 and 15 of the drawings. The cultivator frame may also be equipped with shovels or any other form of cultivating devices if desired.

What is claimed is:—

1. A cultivator of the class described including an adjustable tree clamp provided with means for engaging the trunks of trees of different diameters, a bearing carried by the clamp, a cultivator frame rotatably connected with the said bearing and having cultivating devices and adapted to be rotated around the tree for cultivating the soil adjacent to the same.

2. A cultivator of the class described including a bearing, an adjustable clamp for securing the same to the trunk of a tree at different elevations, a rotary member supported by the said bearing, and a cultivator frame having cultivating devices and connected with the rotary member and adapted to be rotated around the tree.

3. A cultivator of the class described including a bearing, means for securing the same to the trunk of a tree at a point above the surface of the ground, a rotary member supported by the said bearing, a cultivator frame having cultivating devices and connected at its inner portion with the rotary member, and means for connecting a draft animal or animals with the outer portion of the cultivator frame.

4. A cultivator of the class described including a relatively stationary bearing, a circular sectional clamp having adjusting means and adapted to engage the trunks of trees of different diameters and adjustably connected with the said bearing, a rotary ring or member mounted in the bearing, and a cultivator frame having cultivating devices and connected with the rotary ring or member.

5. A cultivator of the class described including a circular bearing, a tree clamp provided with arms supporting the circular bearing and adjustably connected with the same, a rotary member mounted in the said bearing, and a cultivator frame having cultivating devices and connected with the rotary member.

6. A cultivator of the class described including a tree clamp provided with means for engaging the trunk of a tree and having outwardly extending upper and lower arms provided with registering perforations, a circular bearing supported between the said arms, fastening devices adjustably mounted in the said perforations for maintaining the circular bearing in a relatively fixed position, a rotary member mounted in the bearing, and a cultivator frame having cultivating devices and connected with the rotary member.

7. A cultivator of the class described including a tree clamp provided with means for engaging the trunk of a tree and having adjustable supporting means, a bearing comprising a sectional ring or member carried by the said supporting means, a sectional rotary ring or member mounted in the said bearing, and a cultivator frame having cultivating devices and connected with the rotary ring or member.

8. A cultivator of the class described comprising a bearing including a relatively stationary ring composed of sections hinged together at one end and overlapped and interlocked at the other end, a clamp adapted to engage the trunk of a tree and adjustably supporting the bearing, fastening means for securing the overlapped ends of the stationary ring in their interlocked relation, a rotary member mounted in the bearing, and a cultivator frame connected with the rotary member and having cultivating devices.

9. A cultivator of the class described comprising a clamp for engaging the trunk of a tree and having adjustable supporting means, a bearing including a relatively stationary ring supported by the said means and composed of hinged sections detachably secured together, a rotary ring mounted in the said bearing and also composed of hinged sections detachably secured together, and a cultivator frame connected with the rotary ring and having cultivating devices.

10. A cultivator of the class described comprising a circular bearing provided with radial supporting arms having vertical and horizontal anti-friction rollers, means for securing the bearing around the trunk of a tree, a rotary ring arranged upon the horizontal rollers and fitted against the vertical rollers of the said bearing, and a cultivator frame having cultivating devices and connected with the rotary ring.

11. A cultivator of the class described comprising a bearing, means for securing the same around the trunk of a tree, a rotary member mounted in the said bearing, a substantially radially arranged cultivator frame having cultivating devices, and means for adjustably connecting the inner end of the cultivator frame with the rotary member for arranging the cultivating devices different distances from a tree.

12. A cultivator of the class described including a bearing, means for securing the same around the trunk of a tree, a rotary member mounted in the bearing, a cultivator frame having cultivating devices, and means for connecting the rotary member with either end of the cultivator frame.

13. A cultivator of the class described including a bearing, means for securing the same around the trunk of a tree, a rotary ring mounted in the bearing, a cultivator frame having cultivating devices, an adjustable frame slidably mounted on the cultivator frame, means for connecting the adjustable frame with the rotary member, and means for adjusting the said frame.

14. A cultivator of the class described including a bearing, means for securing the same around the trunk of a tree, a rotary ring mounted in the bearing, a cultivator frame having cultivating devices, an adjustable frame slidably mounted on the cultivator frame, means for connecting the adjustable frame with the rotary ring, an operating lever fulcrumed on the cultivator frame and connected with the adjustable frame, and means for securing the lever in its adjustment.

15. A cultivator of the class described including a bearing, means for securing the same around the trunk of a tree, a rotary ring mounted in the bearing, a cultivator frame having cultivating devices, an adjustable frame slidably mounted on the cultivator frame, means for connecting the adjustable frame with the rotary ring, an operating lever connected with the adjustable frame and extending beyond the cultivator frame, means for fulcruming the lever at either side of the cultivator frame, and means for securing the lever in its adjustment.

16. A cultivator of the class described including a bearing, means for securing the same around the trunk of a tree, a rotary ring mounted in the bearing, a cultivator frame provided at the front and back with ratchet teeth, a slidable frame mounted on the cultivator frame and connected with the rotary ring, and a reversible lever fulcrumed on the cultivator frame and extending beyond the same and adapted to be arranged to coöperate with the ratchet teeth of either side of the frame.

17. A cultivator of the class described including a bearing, means for securing the same around the trunk of a tree, a rotary ring mounted in the bearing, a cultivator frame, slidable frames mounted on the cultivator frame at the end portions thereof, means for connecting the rotary ring with either of the slidable frames, and means for adjusting the same.

18. A cultivator of the class described including a bearing, means for securing the same around the trunk of a tree, a rotary ring mounted in the bearing, a cultivator frame, slidable frames mounted on the cultivator frame at the end portions thereof, means for connecting the rotary ring with either of the slidable frames, an operating lever fulcrumed between the slidable frames, and means for connecting the operating lever with either of the slidable frames.

19. A cultivator of the class described including a bearing, means for securing the same around the trunk of a tree, a rotary ring mounted in the bearing, a cultivator frame provided at opposite sides with guiding means, a slidable frame mounted on the cultivator frame and guided by the said means, and opposite longitudinally disposed rods connecting the slidable frame with the rotary ring.

20. A cultivator of the class described including a cultivator frame provided at opposite sides with longitudinal slots, a slidable frame mounted on the cultivator frame and having eyes extending through the slots, flanges carried by the cultivator frame and extending over and engaging the slidable frame, a bearing, means for securing the bearing around a tree, a rotary member arranged in the bearing, and rods connected with the rotary member and with the eyes of the slidable frame.

21. A cultivator of the class described including a bearing, means for securing the same around the trunk of a tree, a rotary member mounted in the bearing, a cultivator frame connected with the rotary member, disks mounted on the cultivator frame, and a draft device having means for connecting it to either side of the cultivator frame for enabling the latter to be rotated around a tree in either direction.

22. A cultivator of the class described including a bearing, means for securing the same around the trunk of a tree, a rotary member mounted in the bearing, a cultivator frame connected with the rotary member, disks mounted on the cultivator frame, and a draft rod connected at its inner end to the cultivator frame and arranged at an angle to the same and provided at its outer end with an arm secured to the cultivator frame and offsetting the draft rod therefrom.

23. A cultivator of the class described including a bearing, means for securing the same around the trunk of a tree, a rotary member mounted in the bearing, a cultivator frame connected with the rotary member, disks mounted on the cultivator frame, and a draft rod connected at its inner end to the cultivator frame and arranged at an angle to the same and provided at its outer end with an arm secured to the cultivator frame and offsetting the draft rod therefrom, said draft rod being provided at its inner portion with a hook having an eye at its outer portion.

In testimony, that I claim the foregoing as my own, I have hereto affixed my signature in the presence of two witnesses.

EUGENE BROWN.

Witnesses:
CARRIE SLATER,
F. L. STOTLER.